(12) United States Patent
Deckler et al.

(10) Patent No.: US 7,198,337 B2
(45) Date of Patent: Apr. 3, 2007

(54) WHEEL FOR BELTED TRACK VEHICLES

(75) Inventors: Harry C. Deckler, Granger, IN (US); Richard J. Vokoun, Lisbon, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 10/727,747

(22) Filed: Dec. 4, 2003

(65) Prior Publication Data
US 2004/0145239 A1    Jul. 29, 2004

Related U.S. Application Data

(60) Provisional application No. 60/441,994, filed on Jan. 23, 2003.

(51) Int. Cl.
*B62D 55/12* (2006.01)
*F16H 55/30* (2006.01)

(52) U.S. Cl. ..................... 305/195
(58) Field of Classification Search ............. 305/100, 305/107, 111, 115, 173, 175, 193, 195, 199; 474/152, 162
See application file for complete search history.

(56) References Cited

U.S. PATENT DOCUMENTS

| | | | | |
|---|---|---|---|---|
| 3,472,563 A * | 10/1969 | Irgens | ................ | 305/112 |
| 3,722,962 A * | 3/1973 | Cooper | ................ | 305/180 |
| 3,899,219 A * | 8/1975 | Boggs | ................ | 305/115 |
| 4,058,023 A * | 11/1977 | Smith | ................ | 474/162 |
| 4,818,041 A * | 4/1989 | Oertley | ................ | 305/137 |
| 5,161,867 A * | 11/1992 | Johnson | ................ | 305/199 |
| 5,190,363 A * | 3/1993 | Brittain et al. | ................ | 305/199 |
| 5,769,512 A * | 6/1998 | Kautsch | ................ | 305/199 |
| 6,000,766 A * | 12/1999 | Takeuchi et al. | ................ | 305/160 |
| 6,652,043 B2 * | 11/2003 | Oertley | ................ | 305/137 |
| 6,698,850 B2 * | 3/2004 | Ueno | ................ | 305/115 |
| 6,843,540 B2 * | 1/2005 | Kanzler | ................ | 305/199 |

* cited by examiner

Primary Examiner—Jason R. Bellinger
(74) Attorney, Agent, or Firm—Emrich & Dithmar LLC

(57) ABSTRACT

A wheel for belted track vehicles includes a hub with an upright central disc. A series of individually cast and machined segments are mounted to the disc in side-by-side relation about the periphery of both sides of the disc. Each segment takes the shape of a truncated sector having a general "L" shape as viewed from an end, with a back or base engaging a side of the disc, and belt support elements extending laterally of the disc for engaging and supporting the track.

24 Claims, 15 Drawing Sheets

WHEEL FOR BELTED TRACK VEHICLES

RELATED APPLICATION

This application claims priority benefit of U.S. provisional application No. 60/441,994, filed Jan. 23, 2003.

FIELD OF THE INVENTION

The present invention relates to wheels for belted track vehicles, such as a wagon or tractor; and more particularly to a metal wheel which may be fabricated from a hub assembly and a series of individually cast and machined segments mounted side-by-side to the hub assembly and extending circumferentially about the hub to form a wheel.

BACKGROUND OF THE INVENTION

Belted track vehicles, including tractors, crawlers and wagons, have found application in the agricultural and construction industries because, among other advantages, they permit operators of agricultural machines to work the field in wetter conditions than are normally permitted with conventional rubber-tire tractors and wagons. Further, belted track vehicles have gained popularity because of their versatility in application. For example, they permit the machine to operate over the soil with reduced compaction of the soil even under normal conditions. This is true, not only in wet conditions, but under general conditions. The reason is that the weight and load of the vehicle are distributed over a larger contact area with the soil. This, in turn, not only reduces soil compaction, but permits an implement such as a grain wagon to carry a greater load while reducing the effects of wet conditions and soil compaction.

The current commercial practice regarding trailed-type vehicles is to use an endless belt or track with rubber guide lugs on the interior surface of the belt and extending inwardly, away from the ground-engaging side of the belt. A pair of pneumatic tire wheel assemblies are used on each end of the belt. These wheel assemblies engage the interior of the belt and, conventional tensioning mechanism straighten, align and tension the belt for use. Steel weldments with idler wheels are also used for the lower, ground-engaging section of the track, holding the track to the ground and distributing the load over a greater contact area.

Conventional pneumatic tire end wheel assemblies have a pair of spaced tires, and the lower idler wheels also include a pair of wheels which are spaced to allow clearance for the guide lugs of the belted tracks which maintain the track in the desired drive position, but are not used as drive elements.

Metal wheels have been suggested for the end wheel assemblies. One such wheel is disclosed in U.S. Pat. No. 5,190,363, which discloses a double-sided wheel having a central groove for receiving the guide lugs of the track, and a plurality of individual metal elements, in the form of elongated blocks, which are bolted to a fabricated metal wheel, and located on either side of the center groove to provide spaced, metal elements for engaging and supporting the interior of the track.

Another type of metal wheel for a belted track machine is disclosed in U.S. Pat. No. 5,769,512. In this embodiment, the entire steel wheel is cast as an integral unit, including a mounting hub, and first and second laterally extending arms for supporting spaced, cantilevered drive members which extend laterally outwardly of the hub and provide engagement members for the inner surface of the track, both for supporting the track and for driving the track. This type of drive wheel is expensive to manufacture since it requires machining of the entire belt engaging surfaces of the belt support elements, as well as machining the regions about the mounting bolts.

Prior art machines with pneumatic tires are sensitive to wheel alignment; and the air pressure of the tires in a paired assembly must be substantially equal in order to maintain the tire side wall and track guide lug pressures to a desired level. Any slight misalignment or unequal tire pressures will cause increased wear because of the friction and rubbing that is generated when the two rubber surfaces are in contact. From the standpoint of belt wear, it is more desirable to use metal for the end wheels since the coefficient of friction between metal and rubber is less than between rubber and rubber.

However, in the past, metal end wheels have been expensive to manufacture, especially the type of drive wheel disclosed in the above '512 patent wherein the entire wheel is cast integrally, and the traction elements are cantilevered. In the event of breakage or substantial damage to the cantilevered members, for example, the entire wheel must be replaced. Depending on the belt tension system of the vehicle, it may be difficult to replace metal wheels, as explained further below. Further, it is comparatively expensive to manufacture such integrally cast wheels and to handle and store them.

SUMMARY OF THE INVENTION

The present invention contemplates the use of a fabricated metal wheel, preferably of ductile iron, for a belted track vehicle. The invention is disclosed in the context of an end wheel (i.e. not a driven wheel) for an agricultural grain wagon, in which case the belted tracks are not driven since the vehicle is intended to be pulled by a tractor. However, persons skilled in the art will appreciate that the present invention may be adaptable for use in a driven metal wheel for a belted track vehicle.

The wheel of the present invention is fabricated from a central hub weldment and a series of individually cast segments. The hub includes a tube for housing bearing assemblies and an axle, and a disc welded to the axle housing tube supported by a pair of conical reinforcing members. A series of bolt holes are formed around the periphery of the disc.

On either side of the disc are mounted, by means of the bolt holes and conventional bolts, a series of integrally cast metal segments arranged in side-by-side relation about the periphery of the disc.

Each of the individual segments has a general "L" shape with a back portion engaging, and bolted to a side of the disc, and a number of feet (oar belt engaging members) extending laterally outwardly of the base portion of the disc. Separate sets of the segments are bolted, as mentioned, to either side of the disc. Each segment preferably includes a plurality of circumferentially spaced support elements or feet for engaging and supporting the track. Each of the support elements is braced against the back portion of the segment for strength.

In addition to facility of assembly, the present invention is advantageous in that only a limited portion of each cast segment is required to be machined in order to maintain accurate location of the support elements for the track. That is, a limited area of each segment is provided for contacting the side of the disc for locating the support elements laterally, and each cast segment has at least one radial locating surface which engages the outer periphery of the disc for locating the segments in a radial direction when they are assembled to the disc. Thus, each of the segments is located relative to the axis of rotation of the wheel in an accurate and reliably repeatable manner with reduced manufacturing costs. If one support element or cast segment is damaged or broken, it may be replaced individually, and without removing the entire wheel from the machine.

Each segment also has at least one axial locating surface which is machined for accurately locating the segment axially of the hub, which serves as a reference for all segments. Thus, only limited machining of small areas is required, and, for economy of manufacture, the axial and radial locating surfaces may be machined in a single operation, as will be disclosed in more detail within.

Another advantage of the present invention over prior solid metal wheels is that the segmented wheel of the present invention is much easier to replace or to install initially. Solid metal wheels may be difficult to install or replace when there is limited retraction of the belt tension system. There must be sufficient retraction to permit the lugs of the heavy belt to clear the center groove of the wheel before the belt can be removed from the wheel and the wheel then removed from the axle. It must be remembered that not only is the belt heavy, but it is very difficult to maneuver, and the solid metal wheel is also very heavy.

With the present invention, if only a few segments need to be replaced, the wheel can be turned to a position at which the damaged segments are free of the lugs, and then only the damaged segments are replaced. If the belt must be removed completely from the wheel, and the play of the tension system will not permit complete removal, as many individual segments as are necessary may be removed simply by removing the bolts, until there is enough slack in the belt to remove the guide lugs from the center wheel groove. The wheel can then be removed completely.

Other features and advantages of the present invention will be apparent to persons skilled in the art in the following detailed description of a preferred embodiment accompanied by the attached drawing wherein identical reference numerals will refer to like parts in the various views.

DETAILED DESCRIPTION OF THE ILLUSTRATED EMBODIMENT

Figure 1:
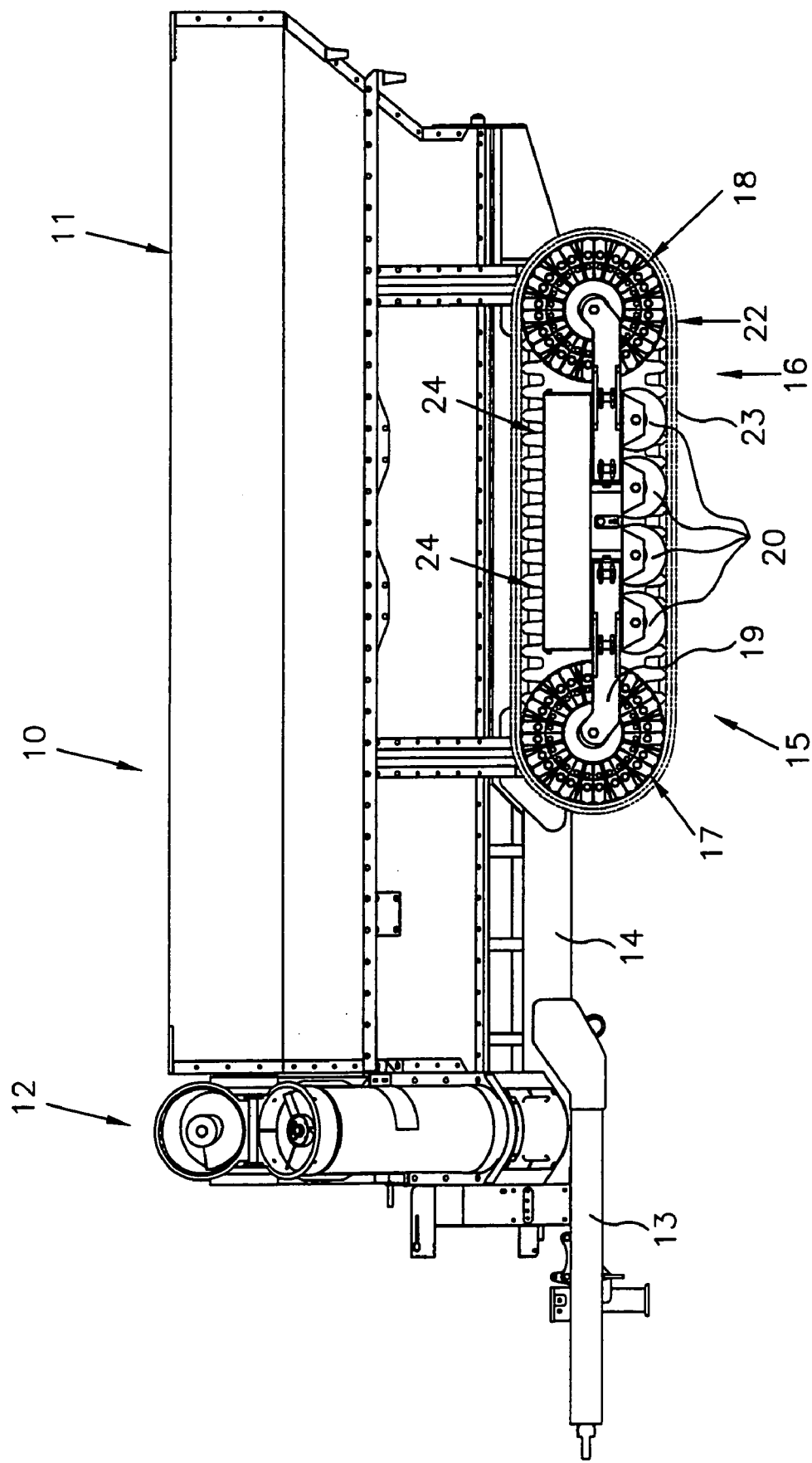
FIG. 1 is a left side view of an agricultural grain wagon incorporating an end wheel constructed according to the present invention.

Referring first to FIG. 1, reference numeral 10 generally designates a vehicle, namely an agricultural grain wagon including a large storage hopper 11, front discharge augers 12, a hitch assembly 13 mounted to a frame 14 and a tracked undercarriage generally designated 15 for supporting the wagon and its contents while permitting the wagon to be pulled by a traction vehicle connected to the hitch assembly 13.

The vehicle of FIG. 1 includes two separate endless belted track assemblies on the undercarriage 15, the left side belted track assembly being shown in FIG. 1 and designated 16. The right side belted track may be similar to the track assembly 16, and therefore need not be discussed in further detail for a complete understanding of the invention.

Each belted track assembly 16 includes a forward end wheel 17 and a rear end wheel 18 mounted to the frame 19 of the undercarriage. Four sets of lower idler wheels 20 are conventionally mounted to the carriage frame 19. Conventional means are also provided for forcing apart the forward and rear end wheels 17, 18 to tension the rubber belt track 22 which is entrained about the end wheels. The belted track 22 includes an outer belt 23 with cleats or tread, and a series of inner lugs 24 which are received in central peripheral grooves on the end wheels 17, 18. The peripheral grooves are aligned and resist lateral forces tending to unseat the belt from the wheels.

Figure 2:
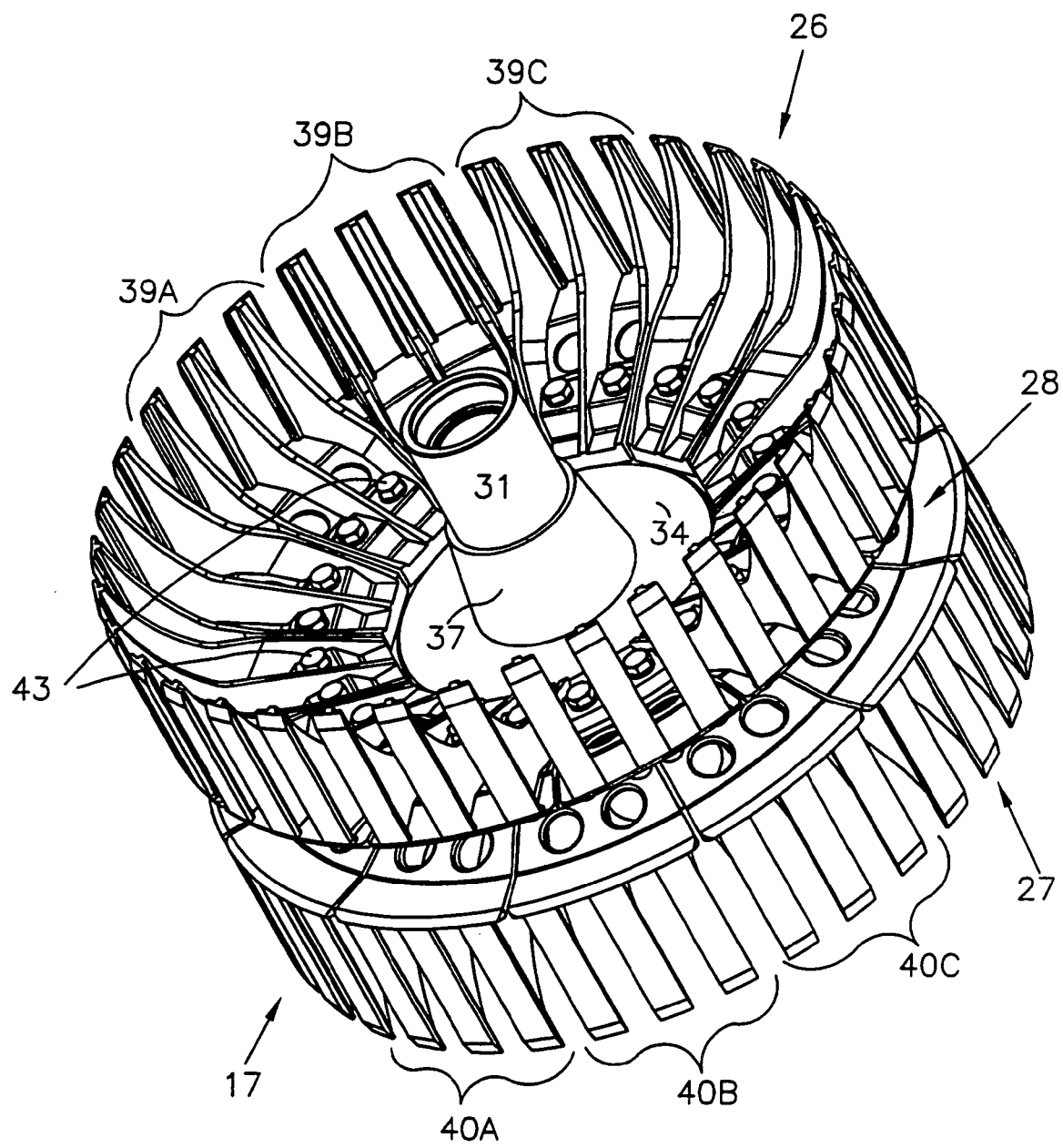
FIG. 2 is a perspective view of a supporting end wheel for the track vehicle of FIG. 1 constructed according to the present invention using individually cast segments.

Turning now to FIG. 2, the forward and rear end wheels may be identical, so that only one need be disclosed for a complete understanding of the invention. The end wheel shown in FIG. 2, and generally designated 17 could thus be used either as a forward end wheel or a rear end wheel, and the same holds true for the belted track assembly on the other side of the vehicle.

Figure 3:
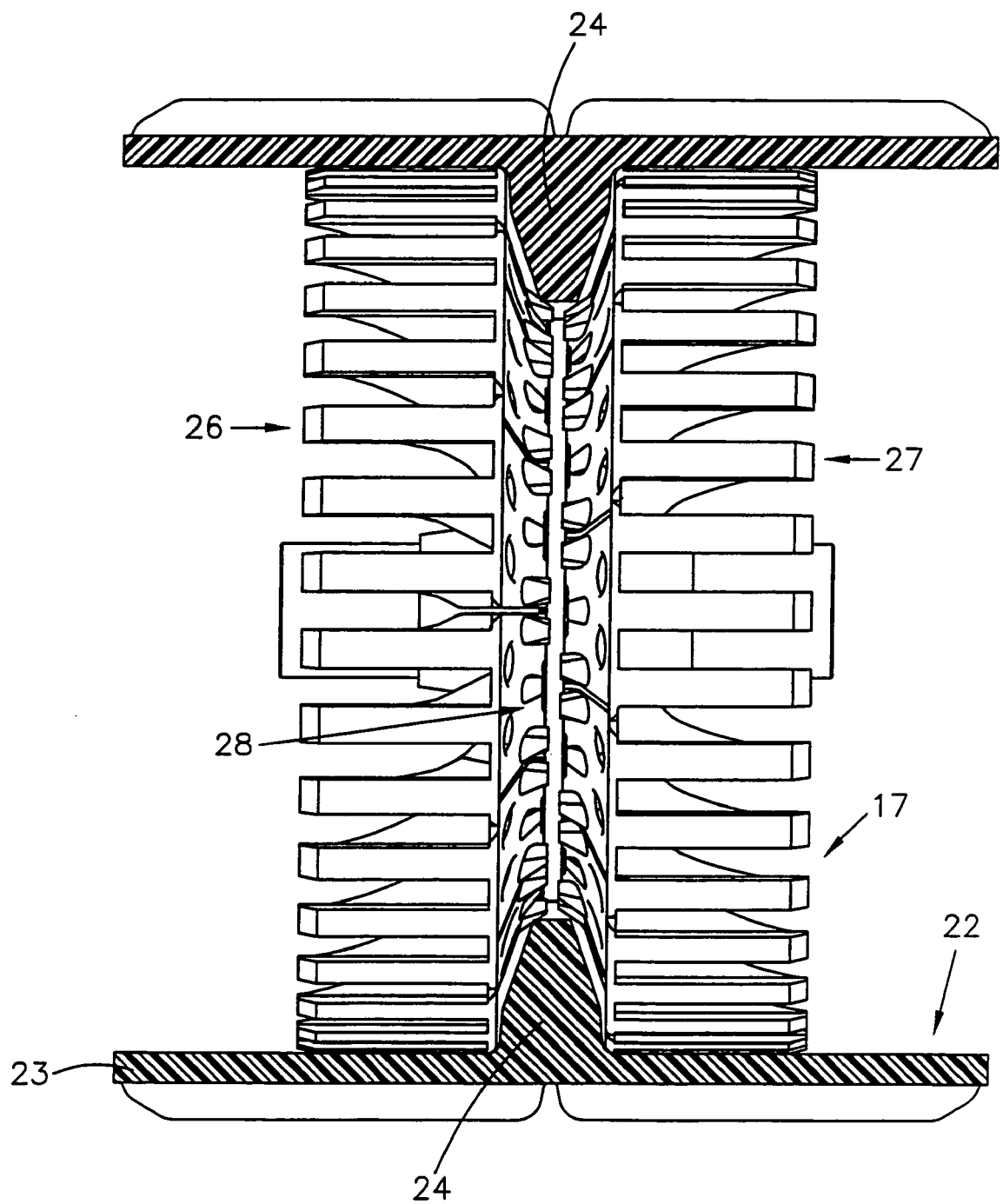
FIG. 3 is an end view of the segmented wheel of FIG. 2 assembled to an endless belted track, with the track shown in cross section.

The end wheel 17 is mounted to the vehicle is shown in FIG. 3. Specifically, the end wheel 17 includes a first side 26 and a second side 27 (i.e. opposing sides) separated by a peripheral groove 28 which receives the lugs 24. Each of the sides 26, 27 of the end wheel are similar so that only one need be described in further detail. The sides 26, 27 are bolted together but include spaced portions which cooperate to define the central peripheral groove 28 which receives the lugs 24.

Figure 6:
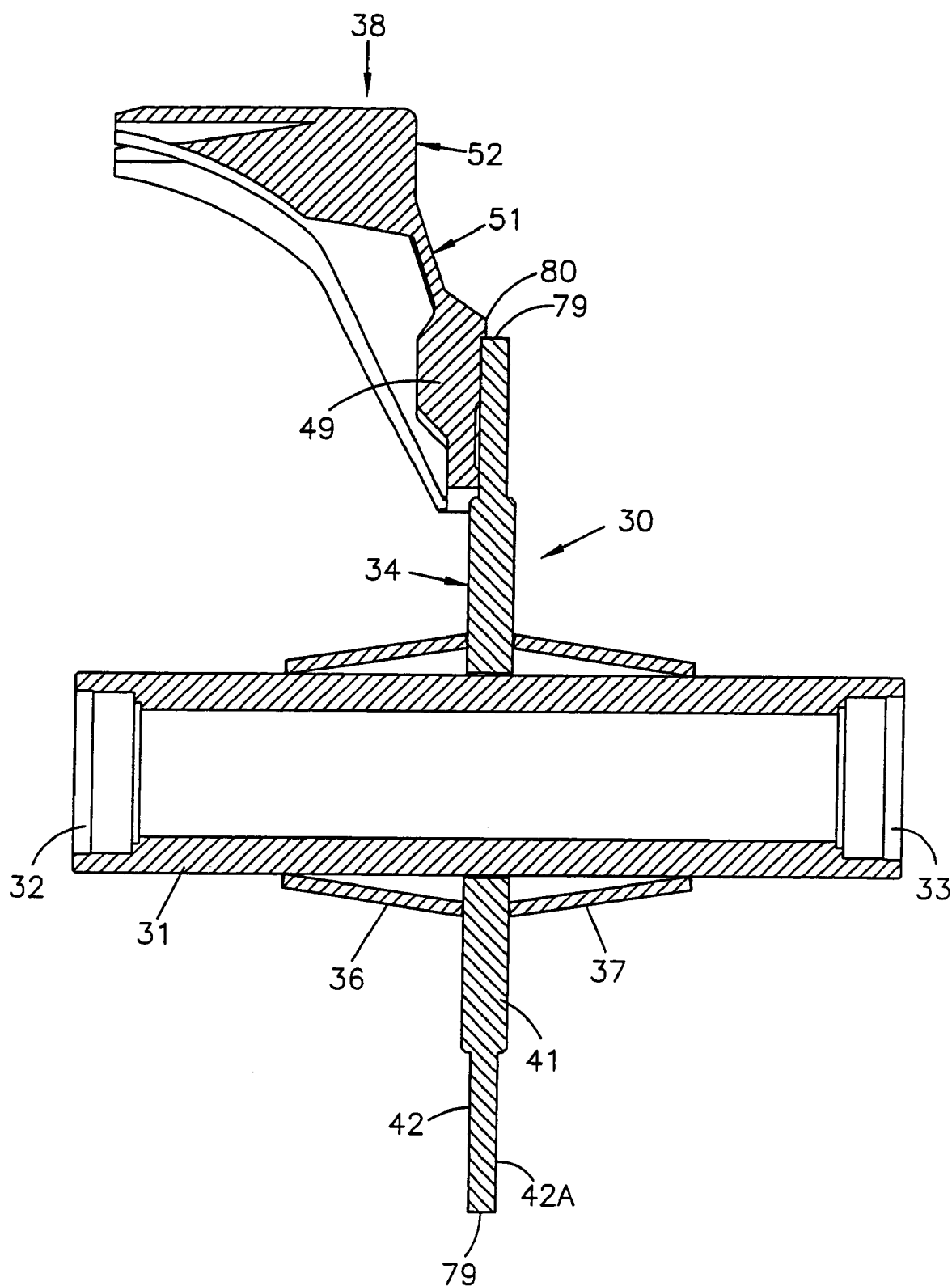
FIG. 6 is a cross sectional view of the hub assembly and one cast segment mounted to the hub assembly taken through the site line 6—6 of FIG. 7.

Turning now to FIG. 6, the wheel 17 includes a hub weldment or assembly generally designated 30. The hub includes an axle tube 31 in which journals 32,33 are formed to receive bearings which mount an axle or shaft (not shown). A disc 34 (in the form of an annulus or thin, in relation to the length of tube 31, circular object to extend about the axle tube or housing 31) is welded to the center of the tube 31. The disc 34 extends vertically under normal operation on a horizontal surface. Left and right frusto-conical reinforcing members 36, 37 extend from the disc 34 outwardly to intermediate locations on the axle tube 31. The conical reinforcing members 36, 37 are welded to both the disc 34 and the tube 31 to strengthen and brace the hub, see also FIG. 2.

Figure 8:
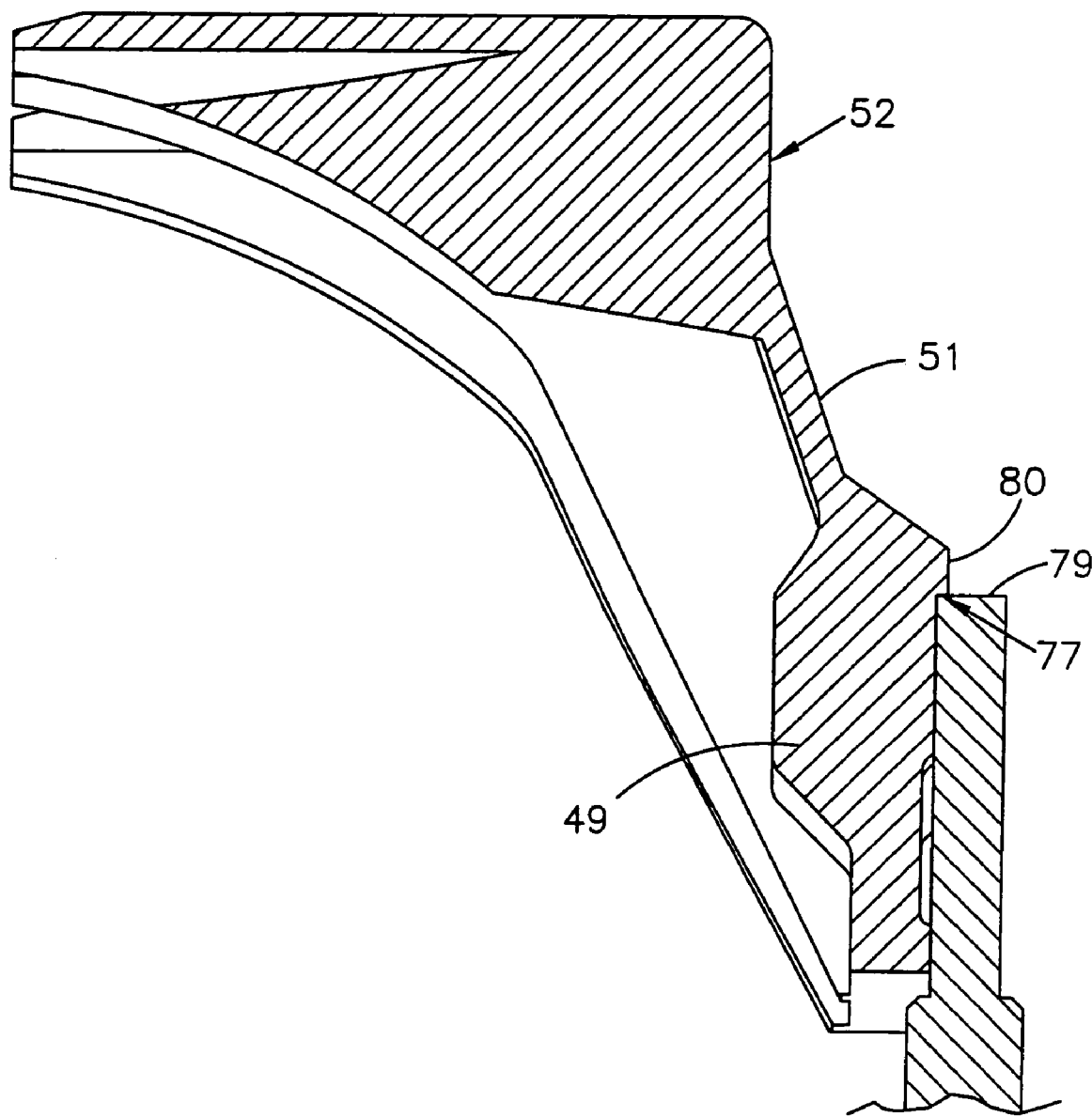
FIG. 8 is an enlarged fragmentary view of the portion of FIG. 6 showing the interface between the cast segment and the outer disc of the hub assembly.

A series of cast metal segments are rigidly mounted to the disc 34. The segments, as will be further understood from the following description, may be bolted together with the disc sandwiched between them. Since the segments may be identical, reference numeral 38 is used to identify a segment in general, as in FIGS. 6 and 8. One set of segments, including the three designated 39A, 39B, and 39C (FIGS. 2 and 5) form a first wheel side 26; and a second set, including those segments designated 40A, 40B and 40C in FIG. 2 form the second wheel side 27. In the illustrated embodiment, there are twelve such segments forming each of the wheel sides 26, 27. More or less segments may be used to form each side.

Figure 5:
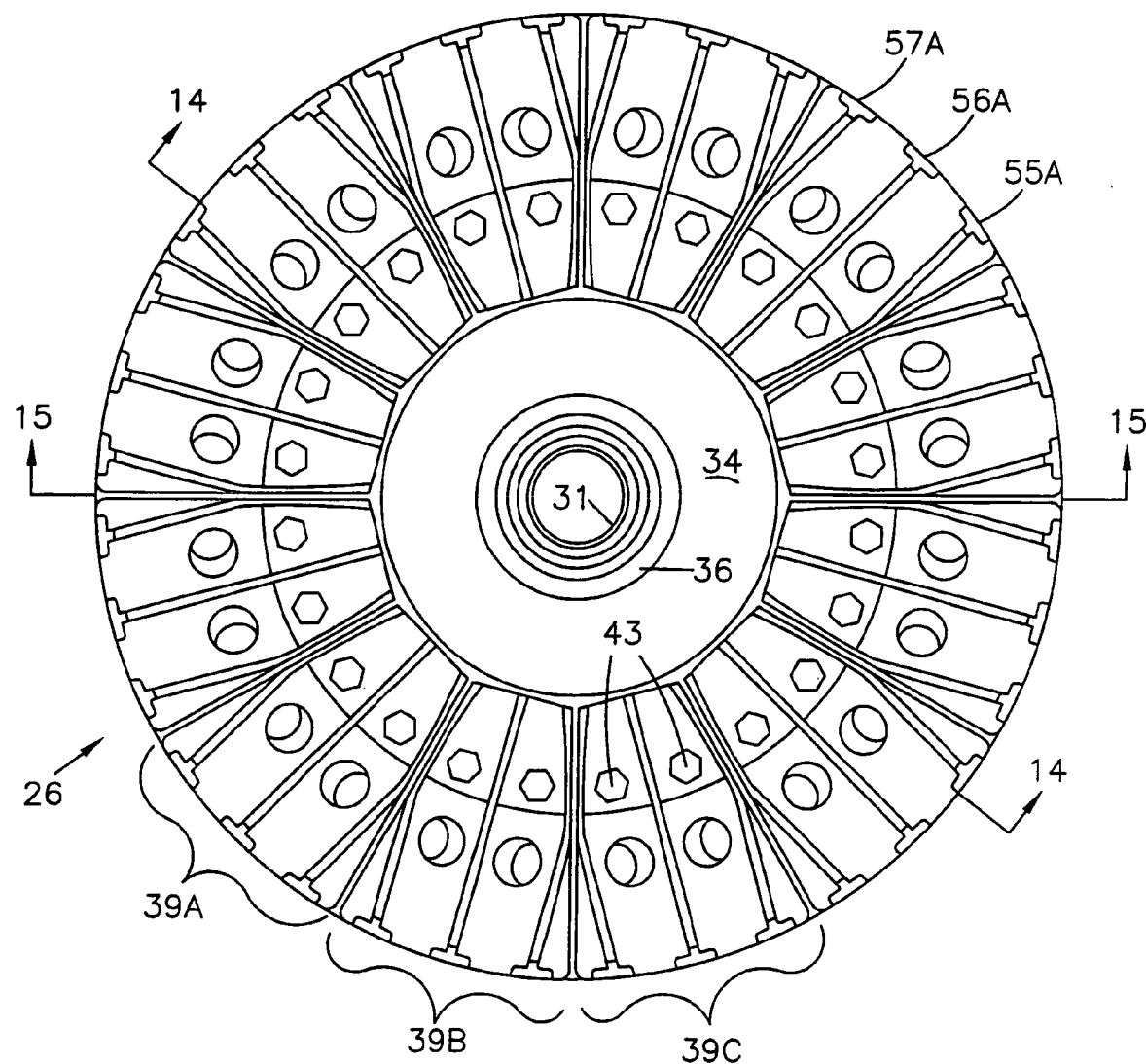
FIG. 5 is a side view of the segmented wheel assembly.

As best seen in FIGS. 2 and 5, the twelve wheel segments are arranged together in side-by-side relation and extend circumferentially about the periphery of the wheel. The segments 39A, 39B, and so on, on one wheel side 26, and the segments 40A, 40B, et al. forming the other wheel side 27 are bolted together by individual bolts such as those designated 43 in FIGS. 2 and 5. The bolts 43 pass through bolt holes in the segments on one wheel side 26, and then through bolt holes 45 located about the periphery of the disc 34 (FIG. 7), and then are threaded into internally threaded aligned holes on the segments 40A, 40B, et al. forming the second wheel side 27. Alternatively, the bolt receiving apertures on the segments 40A, et al. forming wheel side 27, do not have to be internally threaded. Rather, the mounting bolt could pass through an unthreaded hole on the wheel segments forming the wheel side 27, and then secured by a nut. However, it is believed that assembly of the unit is made easier by having the bolts received in threaded holes in the wheel segments of one side.

Figure 7:
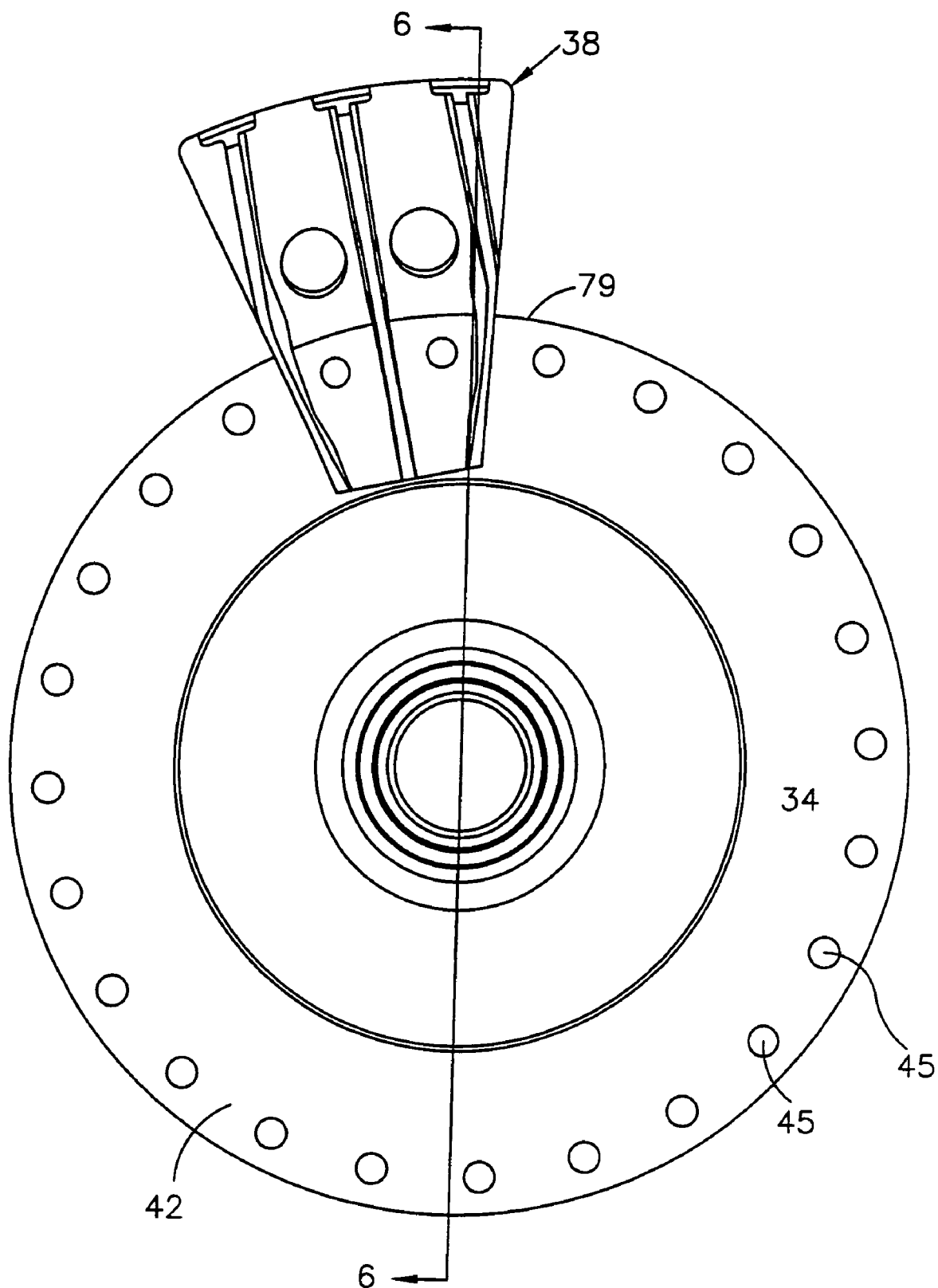
FIG. 7 is a side view of the hub assembly and one cast segment mounted thereto.

It will be observed from FIG. 6 that an inner annular part of the disc 34 which is adjacent the tube is relatively thick, and designated 41 in FIG. 6. The adjacent outer side portions having an annular shape and designated 42, 42A in FIG. 6 are machined to provide opposing annular lateral mounting surfaces of controlled thickness for mounting the segments. As illustrated in FIGS. 6 and 7, the individual cast segments such as the one designated 38 in FIGS. 6 and 7 are mounted to the machined, lateral annular surfaces 42,42A in which the bolt holes 45 are formed adjacent the periphery of the disc.

Figure 9:
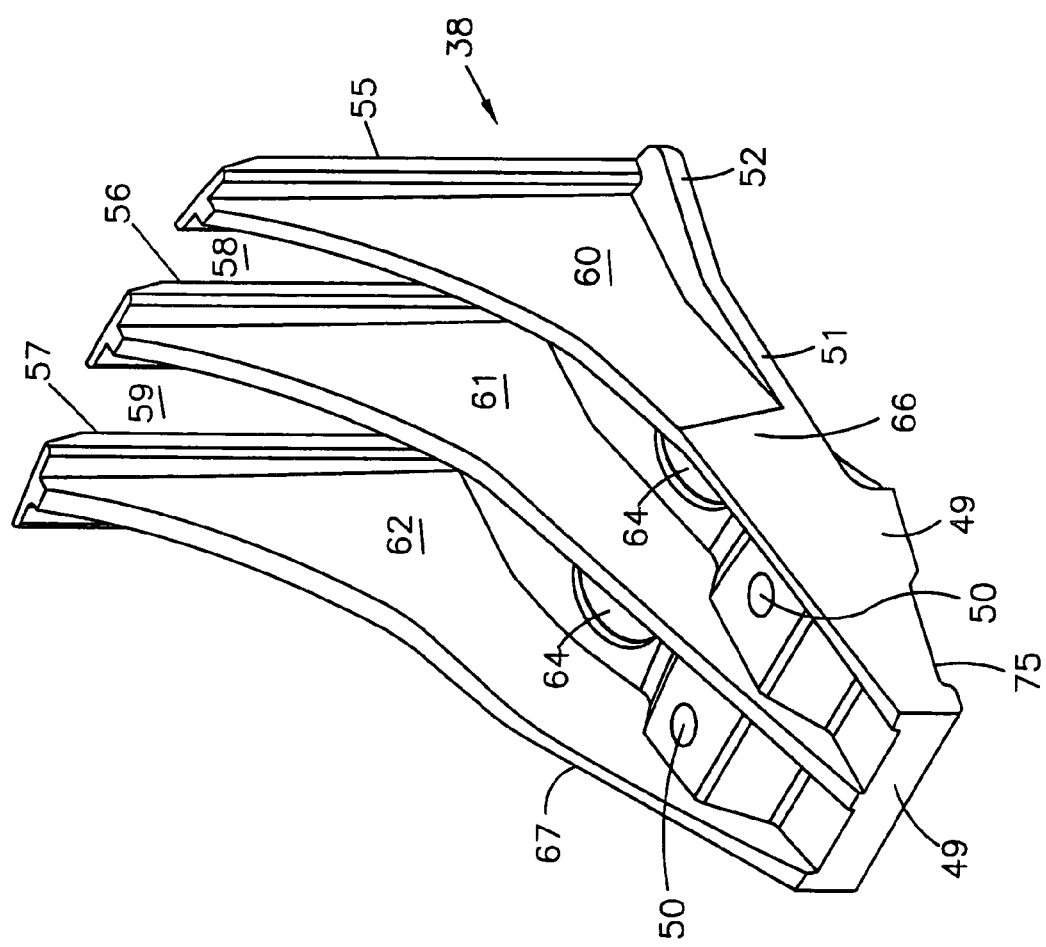
FIG. 9 is a central perspective view of an individual cast segment.
Figure 10:
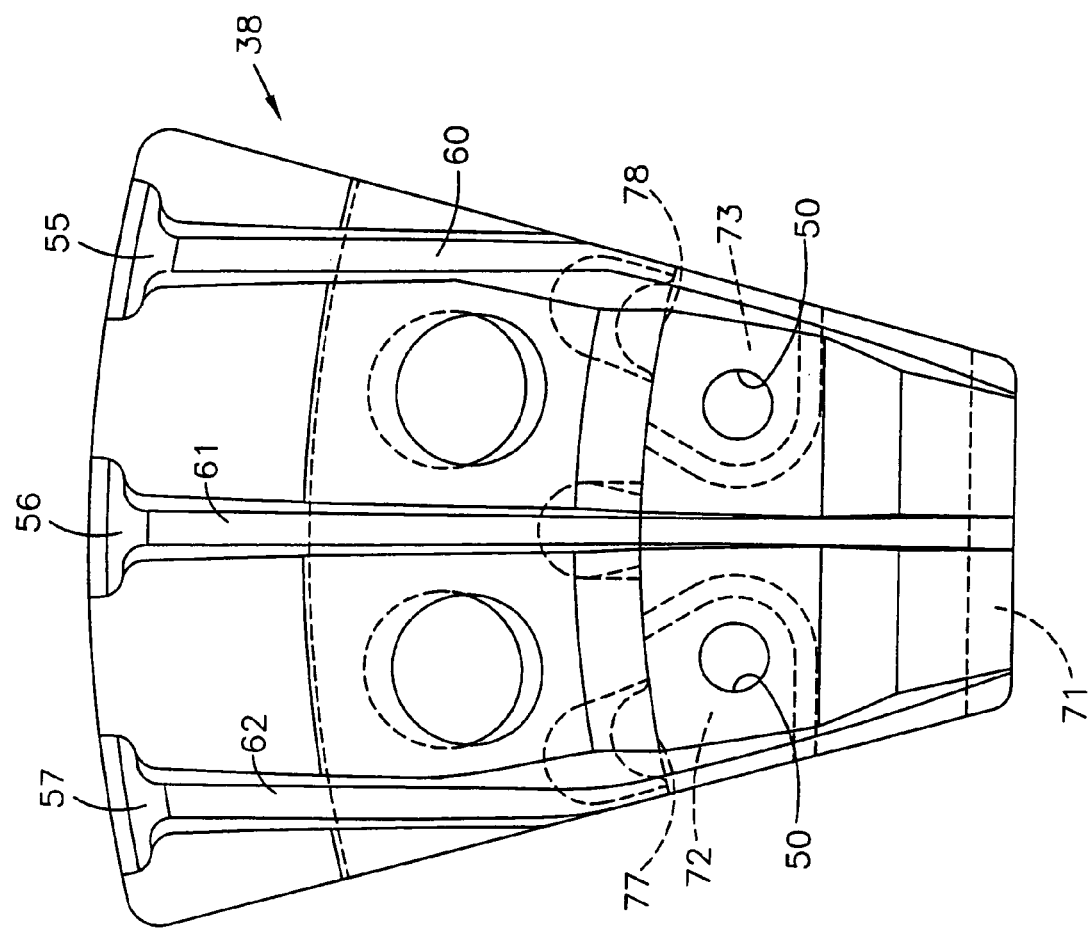
FIG. 10 is an exterior side view of the segment of FIG. 9.
Figure 11:
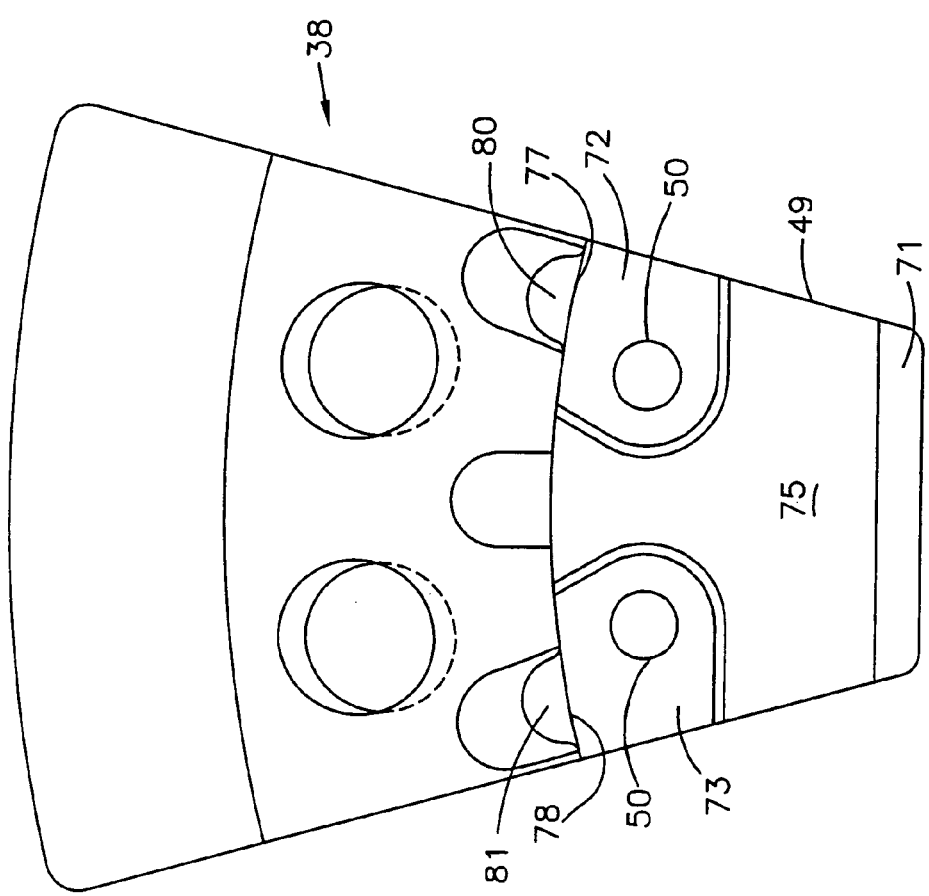
FIG. 11 is an interior view of the segment of FIG. 9.
Figure 12:
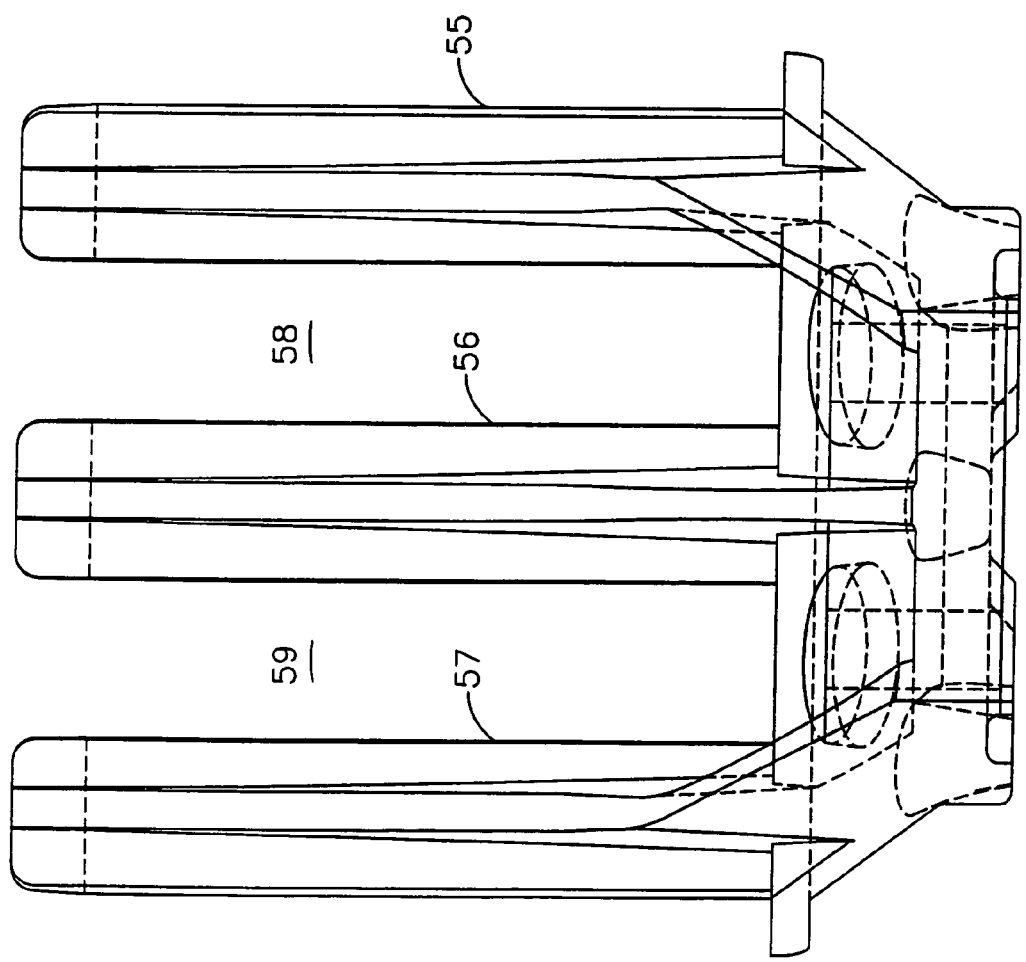
FIG. 12 is an elevational view of the segment of FIG. 9 viewing from the center of the wheel.

Each of the individual segments 39A, et al., 49A, et al. may be identical in shape so that only one need be described further in detail for a complete understanding of the invention. The segment 38 is an individually cast metal (preferably ductile iron) unit, as seen in FIGS. 7 and 9 and takes the general form of a truncated sector when viewed from the side, as seen in FIGS. 10 and 11. The wheel segment 38 as seen in FIGS. 6, 7 and 9–13 will now be described in further detail. It will be realized, however, that as mentioned, all of the segments may be substantially identical, except for the internally threaded bolt holes on one side, if desired.

Figure 13:
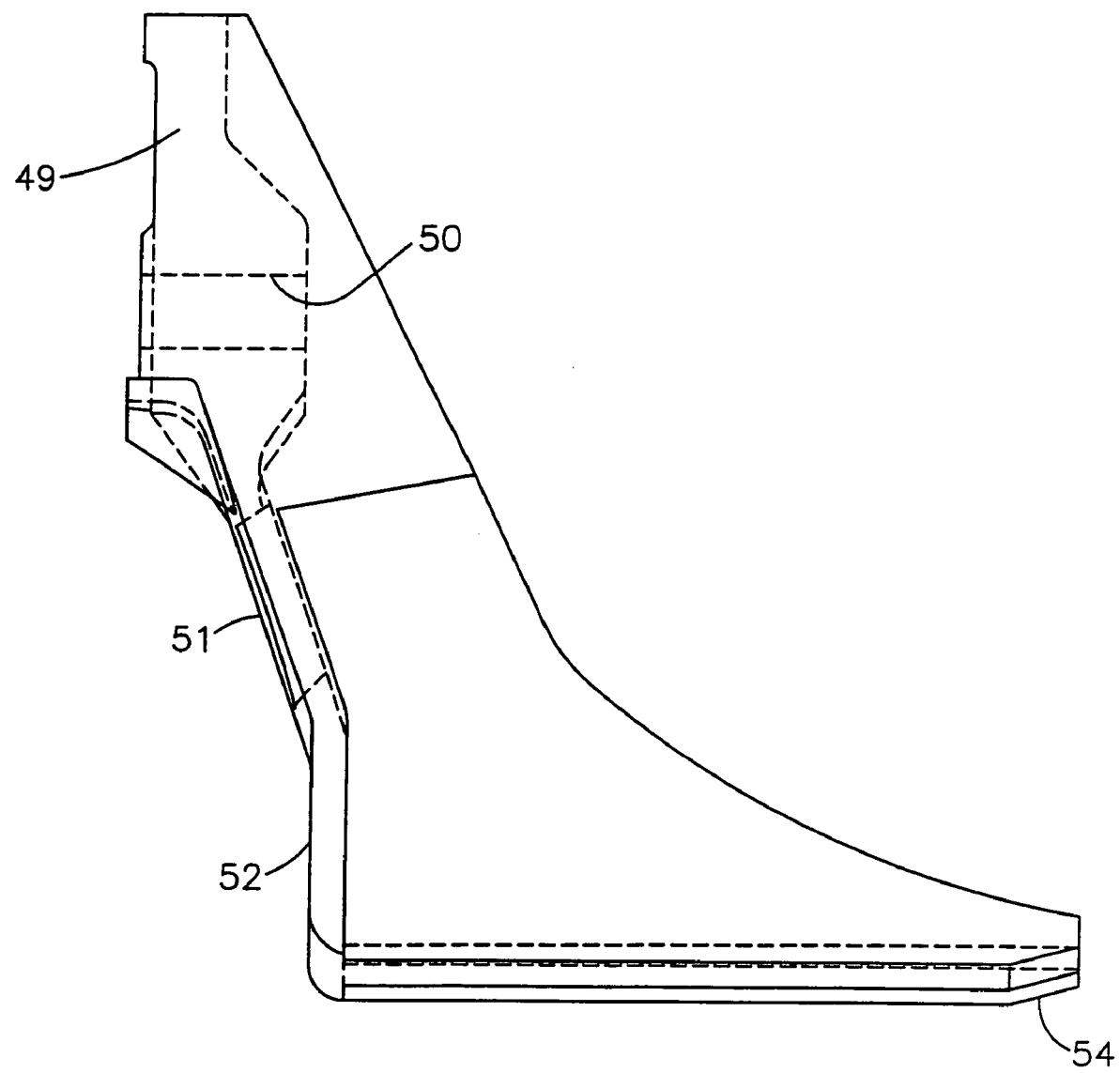
FIG. 13 is an end view of the segment of FIG. 9.

Referring particularly to FIGS. 9, 10, 11 and 13, each individual segment 38 includes a base or back 49. Two bores 50 are formed in the base 49 (FIG. 9) for receiving the mounting bolts 43 (FIG. 5). Extending outwardly from the base 49 is an intermediate section 51 which is inclined outwardly of a plane perpendicular to the axis of rotation of the axle (see FIG. 6 as well). Outwardly of the inclined intermediate section 51 an outer section 52 which is generally parallel to and spaced from the disc 34. As seen in FIGS. 6 and 13, the sections 51 and 52 of the cast segment 38 cooperate to define one side of the central peripheral groove 28 (see also FIG. 4).

At the outermost edge of each segment, extending outwardly of the peripheral section 52 of the base 49, three feet or belt support elements 55, 56 and 57 are formed. Each of the belt support elements 55–57 is spaced from the others to define intermediate openings such as those designated 58 and 59 in FIGS. 9 and 12 to permit the passing of mud or debris which may have adhered to the inner surface of the belt.

Each of the belt support elements 55–57 is supported by a brace designated respectively 60, 61 and 62 in FIG. 9. The support braces 60–62 have a reduced depth toward the base 49 and become progressively thicker (in the axial direction of the wheel) toward the belt support elements 55–57 and extend fully outwardly to the distal ends of those support elements directly beneath the support elements, so that the support elements are fully supported and not cantilevered. The load applied to the support elements 55–57 is thus channeled toward the base 49.

Figure 4:
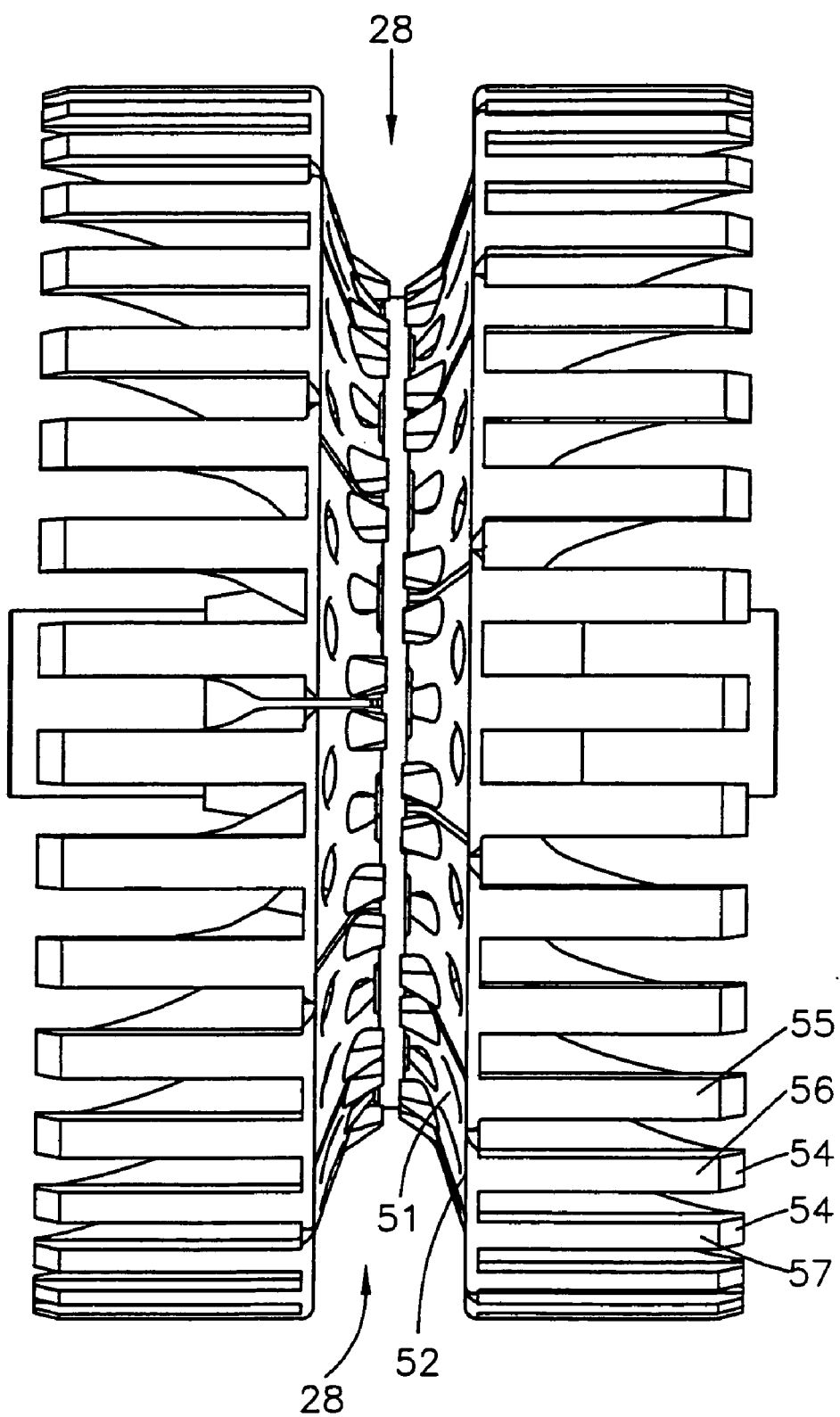
FIG. 4 is an end view of the segmented wheel assembly without the belted track.

It will be observed from FIG. 9 that there are two bolt apertures 50 formed in each cast segment in the illustrated embodiment, although one or more could be used, depending on the number of belt support members per segment. The bolt apertures are located between adjacent ones of the support braces 60–62. It will also be observed from FIG. 9 that two larger apertures designated 64 in FIG. 9 are formed in the intermediate section 51 of the segment. The apertures 64 are located toward the bottom of the central peripheral groove of the assembled wheel, as seen in FIG. 4; and they permit the passage of debris from the groove and located between the wheel and the guide lugs 24 of the belted track so that the debris is able to clear itself from the belt and the wheel. It will also be observed that in order to conform to the narrowing width of the segment approaching the center of the wheel, the braces 60, 62 are inclined toward the center of the wheel, as indicated at 66 and 67 respectively.

Referring now to FIGS. 4 and 13, the distal ends of the belt support elements 55–57 are beveled as at 54 in order to prevent or reduce damage to the interior of the belt.

Turning now to FIG. 11, the back or disc-engaging portion of segment 38 is seen. The base 49 has three surfaces which engage the adjacent surface of the disc, designated respectively 71, 72 and 73. The machined surfaces 71, 72 nd 73 engage a lateral mounting surface 42 or 42A of the disc 34 of the hub 30 to accurately locate the segment, and thus the belt support elements, axially of the wheel. Thus, the surfaces 71,72 and 73 are sometimes referred to as axial locater surfaces. The remainder of the back side of the base 49, other than the bolt holes 50, namely, the area designated 75 in FIG. 11 is recessed (see also FIG. 9) and need not be machined. This leaves only the two surfaces 72, 73 which surround the bolt holes 50 and the lower edge surface 71 which are required to be machined in order to achieve the desired tolerance in locating the belt support elements 55, 56 and 57 axially for each segment. Other arrangements of axial locater surfaces, or even a single surface could be conceived, and are within the scope of the invention.

There are two additional surfaces on the back of each segment which are machined. These surfaces, designated 77 and 78 in FIGS. 6 and 11 are curved radial locater surfaces located at the portion of two locating lugs 80, 81 which partially define the rear of the base portion 49 of the wheel segment. The machined surfaces 77, 78 engage the outer peripheral contact or bearing surface 79 of the disc 34 (FIGS. 6 and 8) which is also machined and is cylindrical.

Locater surfaces 77 and 78 extend about the axis of rotation of the hub, at a constant distance or radius. Thus, these surfaces locate the segment in a radial direction (thus, "radial locater surfaces"). In this manner, when the segments are mounted to the disc, the outer surfaces of the individual belt support segments or feet 55–57 (FIG. 9) are uniformly spaced radially from the axis of rotation of the wheel as well as axially from the vertical center plane of the hub (or wheel) transverse of the axis of rotation, thus forming a cylindrical belt support comprised of spaced elements or feet. As seen in FIG. 5, the outer, belt-engaging surfaces of the support elements 55–57, designated 55A, 56A and 57A for one segment in FIG. 5, are cast such that the outer engagement surfaces define individual segments of a cylinder having an axis co-linear with the axis of rotation of the wheel. These belt-engaging surfaces need not be machined, thus, reducing manufacturing costs.

It will be apparent to persons skilled in the art that all of the desired contour of each segment, including the curvature of the belt-engaging surfaces of the belt support members 55–57, as well as the bevel 54 of the distal end for each of the segments may be formed during the casting process. Accuracy of the radial location of the belt-engaging surfaces is uniformly determined by machining the radial locater surfaces 77, 78 of the lugs 80, 81 on the back of the base 49 of each segment casting, and the corresponding contact surface 79 or other circumferential contact surface of the disc 34.

It will be further appreciated that the amount of machining that needs to be done and the amount of material to be removed for accurate location of the segments is modest in comparison with prior art wheels, and provides for a cost effective fabricated wheel. For example, the machining of the axial locater surface 71, 72 and 73 as well as the radial locater surfaces 77, 78 of each segment may be accomplished in a single operation, with one set-up, in a computer numerically controlled machine. The outer peripheral surface 79 and the outer annular surfaces 42, 42A (FIG. 6) of the hub must also be machined.

The segments located on opposing faces of the disc may either be aligned so that both bolt holes 50 of one segment are aligned with the corresponding bolt holes of the opposing segment to which it is bolted; or the segments may be staggered by offsetting the bolt holes such that one of the bolt holes on one side of a segment aligns with a bolt hole of a segment on the opposing surface of the disc, but the radial edges of the segments are offset. It will also be observed that by threading the interior of the bolt holes 50 for only one of the castings, a similar arrangement of aligned or laterally offset opposing segments is readily obtained.

Figure 14:
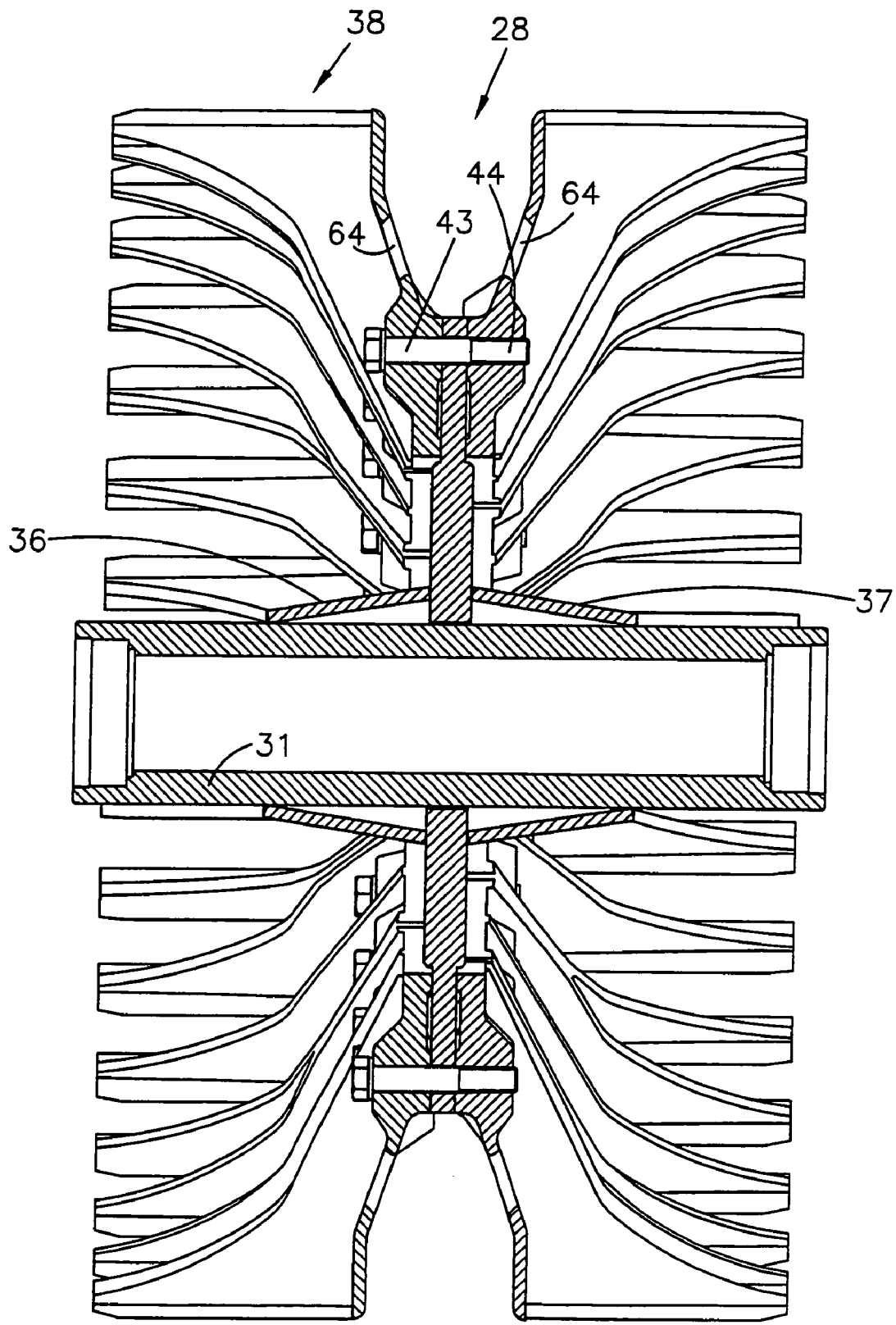
FIG. 14 is a cross sectional view of a segmented wheel assembled to a hub assembly taken through the site line 14—14 of FIG. 5.
Figure 15:
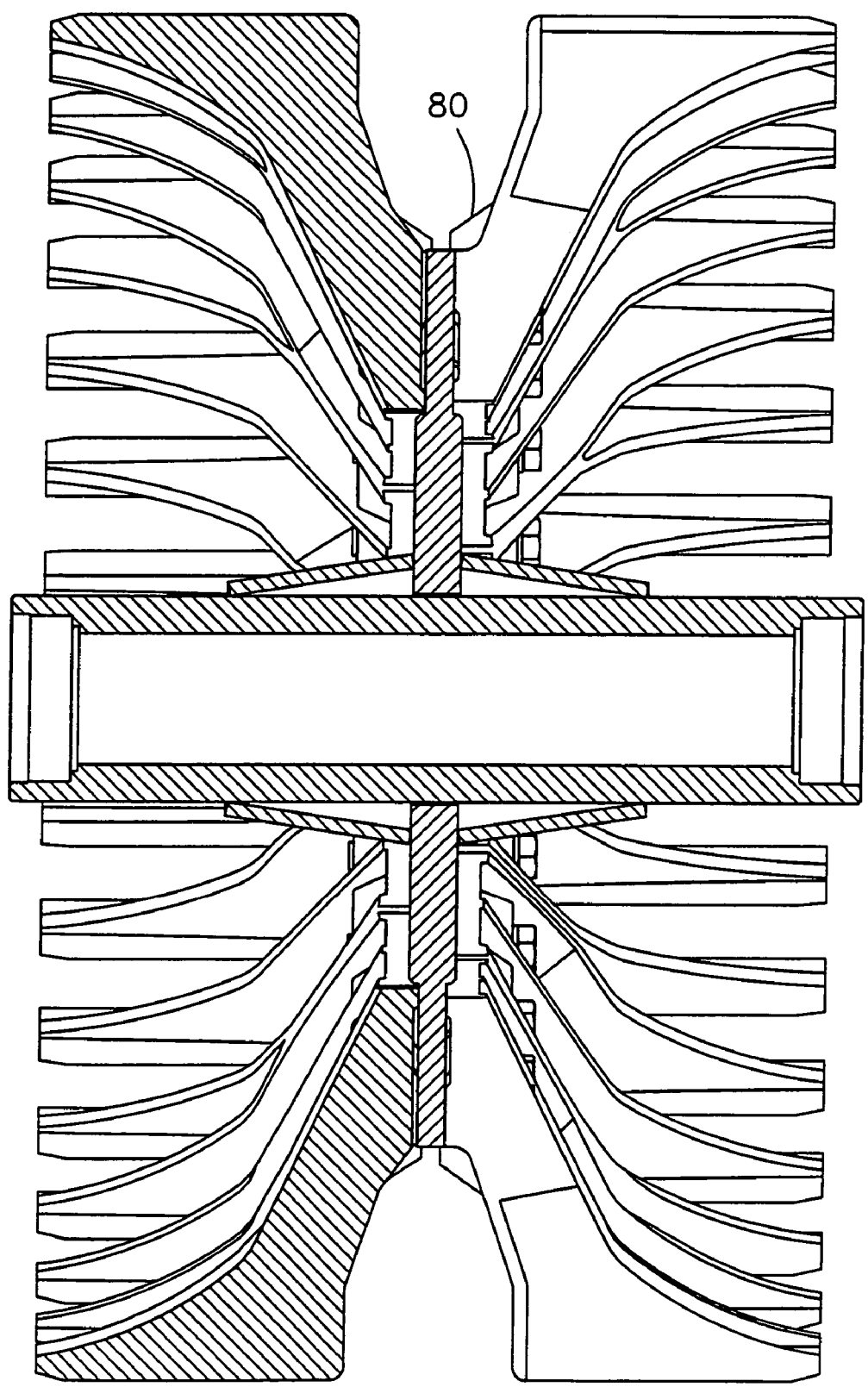
FIG. 15 is a cross sectional view taken through the site line 15—15 of FIG. 5.

FIG. 14 shows offset segments having their corresponding bolt holes aligned with a bolt 43 passing through the cast segment 38 on the left and having a threaded portion 44 threaded into the base of the segment on the right. This is shown for both the upper most segment pair and the lower most segment pair. FIG. 15, which is a cross sectional view taken through the site line 15—15 of FIG. 5, illustrates that when the opposing segments are offset radially relative to one another, the braces of the outer belt engaging support surfaces are not aligned. See also FIG. 4.

It will thus be appreciated that by making individual, cast segments as disclosed herein, a metal wheel for an endless belted track may be fabricated from a simple, economical hub assembly, yet maintaining the desired tolerances for accurately locating the spaced belt engagement segments, both radically and laterally, with a minimum of machining of the segments.

Having thus disclosed in detail the illustrated embodiment of the invention, persons skilled in the art will be able to modify certain of the structure which has been illustrated and to substitute equivalent elements for those described while continuing to practice the principle of the invention; and it is, therefore, intended that all such modifications and substitutions be covered as they are embraced within the spirit and scope of the appended claims.

We claim:

1. A wheel for an endless track for a vehicle, comprising:
a hub including a disc-shaped mounting plate having a width substantially less than the width of said track and extending generally perpendicular to an axis of rotation of said hub, said mounting plate including a circumferential contact surface of uniform spacing from said axis of rotation and first and second lateral mounting surfaces on opposite sides of said mounting plate;
a first plurality of metal wheel segments mounted to said first lateral mounting surface of said mounting plate and
a second plurality of metal wheel segments mounted to and engaging said second lateral mounting surface;
each of said wheel segments including at least one axially extending support element for supporting said track, and a first locater surface for contacting said circumferential contact surface of said hub for locating said segment in a radial direction, and a second locater surface for contacting one of said lateral mounting surfaces of said mounting plate for locating said segment axially;
said wheel segments of said first and second pluralities including respective inner surfaces cooperating to define a central peripheral groove sized to receive radially extending positioning lugs of said belt.

2. The wheel of claim 1 wherein said hub includes an outer annular section defining said circumferential contact surface and said first and second lateral mounting surfaces.

3. The wheel of claim 2 wherein said circumferential contact surface is centered on said axis of rotation of said hub, and said lateral contact surfaces are generally planer.

4. The wheel of claim 3 wherein said lateral mounting surfaces are flat and extend in respective planes generally perpendicular to said axis of rotation.

5. The wheel of claim 4 wherein each segment comprises a plurality of axially extending support members for engaging and supporting said track, and a radially extending brace member increasing in an axial dimension proceeding away from said axis of rotation to a distal end formed integral with an associated support element and supporting the same substantially its entire axial length.

6. The wheel of claim 5 wherein each segment further comprises a base portion defining said second locater surface, an intermediate portion extending axially away from an associated lateral mounting surface of said hub; and an outer section extending generally radially of said axis of rotation and integral with a distal portion of said brace and said support element.

7. The wheel of claim 1 wherein each of said segments is integrally formed from metal as a single element and includes a plurality of axially extending support members for supporting said track; and includes a bolt receiving aperture in said base, said wheel including a threaded fastener securing two opposing segments together and to said hub.

8. The wheel of claim 7 wherein segments of said first plurality are angularly offset relative to segments of said second plurality.

9. The wheel of claim 1 wherein said hub includes an outer annular region of generally uniform width defining said first and second lateral mounting surfaces as parallel planar radial surfaces.

10. The wheel of claim 9 wherein said circumferential surface is cylindrical and said first and second lateral surfaces are flat, and wherein said circumferential contact surface and at least a portion of said lateral mounting surfaces are machined.

11. The wheel of claim 10 wherein each of said first locater surfaces of said wheel segments includes first and second radially spaced lugs having surfaces engaging said circumferential contact surface of said hub.

12. The wheel of claim 10 wherein each of said second locater surfaces of said wheel segments comprises first and second contact portions adjacent associated bolt holes.

13. The wheel of claim 12 wherein each of said second locater surfaces of said wheel segments includes a third contact portion adjacent a radially inboard end of said segment.

14. The wheel of claim 1 wherein each of said segments includes a plurality of generally parallel track support elements spaced angularly apart relative to said axis and further including an intermediate section extending axially away from an associated lateral surface of said hub, said intermediate section defining at least one aperture for permitting debris to pass therethrough.

15. The wheel of claim 1 wherein said hub comprises an axle tube; said mounting member of said hub comprising a disc mounted to said axle tube; and first and second frustoconical reinforcing members located on opposing sides of said disc and extending between said axle tube and said disc.

16. A wheel for a vehicle having a continuous ground-engaging belted track, comprising:
a hub including a mounting member having a thickness substantially less than a width of said track and defining opposing generally upright mounting surfaces extending radially outward from an axis of rotation of said hub;
first and second pluralities of cast metal segments, each plurality of segments mounted in side-by-side relation respectively on opposing lateral sides of said mounting member,
each segment including a base engaging one of said mounting surfaces of said mounting member, and a plurality of circumferentially spaced support elements each having a belt engaging surface, and cooperating to form a support for said belt; and
threaded fasteners for removably mounting said segments to said mounting surfaces of said mounting member.

17. The wheel of claim 16 wherein each segment is in the form of a truncated sector.

18. The wheel of claim 16 wherein said segments of said first plurality of segments are angularly offset relative to segments of said second plurality of segments.

19. The wheel of claim 18 wherein the support elements of said first plurality of segments are angularly offset relative to said support elements of said second plurality of segments.

20. The wheel of claim 18 wherein each of said segments includes a base defining an aperture for receiving a mounting bolt, said base defining an axial locater surface for engaging an associated upright mounting surface of said mounting member of said hub and wherein said axial locater surface of said base at least partially surrounds said bolt aperture.

21. The wheel of claim 20 further including a curved contact surface on said base member extending angularly about said axis of rotation and located centrally of said segment.

22. The wheel of claim 20 comprising a plurality of lugs each defining an axial locater surface engaging a circumferential contact surface of said hub.

23. A cast metal segment for a wheel for a belted-track vehicle, said wheel including a hub having a circumferential contact surface and at least one generally vertical lateral mounting surface, said segment comprising:
a base defining at least a first locater surface for contacting said contact surface of said hub to locate said segment radially about an axis of rotation of said hub;
an intermediate section extending radially outward of said base and inclined radially outwardly of said lateral mounting surface of said hub when said segment is mounted thereto;
an outer section spaced from and generally parallel to said lateral mounting section of said hub when said segment is mounted thereto;
a plurality of axially extending belt support elements cast integrally with said outer section; and
an integrally cast brace for each of said belt support elements extending between said base section and said intermediate section and an associated belt support element.

24. A wheel for a vehicle having a continuous ground-engaging belted track comprising:
a hub including a disc having a thickness substantially less than a width of said track and extending radially outward of an axis of rotation of said hub assembly;
first and second pluralities of cast metal segments,
individual segments of said first and second plurality of segments mounted in side-by-side relation respectively on opposing radial sides of said disc,
each segment including a base engaging one side surface of said disc, and a plurality of spaced support elements having belt engaging surfaces forming a cylindrical support for said belt; and
threaded fasteners for removably mounting said segments to said radial sides of said disc.

* * * * *